(12) United States Patent
Ikuta

(10) Patent No.: US 6,286,773 B1
(45) Date of Patent: *Sep. 11, 2001

(54) DOUBLE BEARING REEL HAVING IMPROVED DRAG MECHANISM CONFIGURATION

(75) Inventor: Takeshi Ikuta, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,226

(22) Filed: Feb. 3, 2000

Related U.S. Application Data

(63) Continuation of application No. 09/098,535, filed on Jun. 17, 1998, now Pat. No. 6,045,073.

(30) Foreign Application Priority Data

Jun. 20, 1997 (JP) .................................................. 9-164579

(51) Int. Cl.[7] .................................................. A01K 89/00
(52) U.S. Cl. ........................ 242/260; 242/319; 242/322
(58) Field of Search .................................. 242/260, 270, 242/271, 279, 303, 319, 322

(56) References Cited

U.S. PATENT DOCUMENTS

| | | | |
|---|---|---|---|
| 4,131,245 | * 12/1978 | Noda | 242/270 |
| 4,742,974 | * 5/1988 | Furomoto | 242/319 X |
| 4,813,629 | * 3/1989 | Hashimoto et al. | 242/319 X |
| 4,852,826 | * 8/1989 | Sato | 242/319 X |
| 4,899,952 | * 2/1990 | Aoki | 242/260 |
| 4,901,944 | * 2/1990 | Aoki | 242/260 |
| 5,219,131 | * 6/1993 | Furomoto | 242/271 X |
| 5,297,756 | * 3/1994 | Ikuta | 242/270 |
| 5,503,344 | * 4/1996 | Yamaguchi | 242/260 |
| 5,626,303 | * 5/1997 | Bringsen | 242/270 X |

* cited by examiner

Primary Examiner—Emmanuel M. Marcelo
(74) Attorney, Agent, or Firm—Shinjyu Global IP Counselors, LLP

(57) ABSTRACT

A double bearing reel is provided with a reel body (1), a handle having a handle shaft (31), a spool shaft (5) disposed in parallel with the handle shaft (31), a spool (4), a drag mechanism (6), and a first torque transmission mechanism (9a) for transmitting a rotation of the handle to the drag mechanism. The spool has a fishing line drum portion (4a) and flange portions (4b) and (4c) formed on both sides of the fishing line drum portion. A drag mechanism (6) has a brake portion (26) having a brake disc (55) disposed coaxially with the spool and cooperating with the spool, and a frictional disc (56) disposed to face and to be pressingly contactable with the brake disc and being non-rotatable in a fishing line feed direction, and a spool shaft moving mechanism (25) for braking the spool by the relative movement between the brake disc and the frictional disc in the press contact direction. The brake diameter is 90% or more of a fishing line windable diameter of the spool. In the double bearing reel, the drag mechanism suppresses pressure force enhancing brake performance.

4 Claims, 8 Drawing Sheets

DOUBLE BEARING REEL HAVING IMPROVED DRAG MECHANISM CONFIGURATION

This application is a continuation of application Ser. No. 09/098,535, filed Jun. 17, 1998 now U.S. Pat. No. 6,045,073, now allowed.

BACKGROUND OF THE INVENTION

A. Field of the Invention

The present invention relates to a double bearing reel, and more particularly to a double bearing reel provided with a drag mechanism for braking a spool where the drag mechanism is controlled by movement of a lever.

B. Description of the Related Art

A fishing reels having drag mechanisms are known. A lever drag type double bearing reel for braking a spool by movement of a spool shaft in an axial direction by means of a lever is known as a double bearing reel. This double bearing reel is provided with a reel body having a pair of side plates, a spool shaft supported on the reel body movably in the axial direction, a spool rotatably supported to the spool shaft, a drag mechanism for braking the spool and a torque transmission mechanism for rotating the spool by the rotation of a handle.

The spool is movable in the axial direction together with the spool shaft. The drag mechanism is provided with a brake disc provided on an outer surface at one end of a flange portion of the spool, a frictional disc which may be pressed into contact with the brake disc, and a spool shaft moving mechanism for moving the spool shaft in the axial direction. The frictional disc is rotatably supported to the spool shaft, and a torque from the handle is transmitted to the frictional disc through the torque transmission mechanism. The spool shaft moving mechanism has a drag lever pivotably supported on the reel body, a cap member fixed to one end of the spool shaft, and a cam member disposed between the drag lever and the cap member and mounted so as to be unrotatable on the reel body. A slant cam is formed on the cam member. When the drag lever is swung, the drag lever rides over the slant cam so that the cam member pushes the cap member to thereby move the spool shaft in one axial direction. The movement of the spool shaft in the other axial direction is performed by a biasing force of, for example, a coil spring disposed between the frictional disc and the brake disc.

In such a double bearing reel, the drive force produced by rotation of the handle is transmitted to the frictional disc of the drag mechanism through the torque transmission mechanism and transmitted to the spool by the press contact between the frictional disc and the brake disc.

In the thus constructed drag mechanism, the adjustment of the drag force (brake force) is performed by pivotal movement of the drag lever mounted at one end of the spool shaft in one direction. When the drag lever is pivotally moved in one direction, the spool shaft is moved in one axial direction by the cam member, and the spool approaches the drag mechanism so that the brake disc is brought into pressing contact with the frictional disc. In such a double bearing reel, the brake force of the drag mechanism is adjusted by the operation of the drag lever and at the same time, the spool is kept in a free rotation condition by separating the brake disc and the frictional disc from each other.

PROBLEM TO BE SOLVED BY THE INVENTION

In general, in such a kind of a drag mechanism, a magnitude of the brake force depends upon the number of the disc members of the two discs to be brought into pressing contact with each other and a diameter/area of the portions where the brake force is to be generated. In particular, the greater the diameter of the portions where the brake force is to be generated, the greater the brake torque to the pressure force will be. The greater the area, the greater the frictional force will be. However, in the double bearing reel having the above-described conventional drag mechanism, since the brake disc is provided at an end face of the spool, the diameter or the area of the brake disc is limited by the size of the spool (diameter of the flange portion). Typically, the brake disc in prior art reels has a diameter that is about 70% of the diameter of the flange. For this reason, in the conventional double bearing reel, the brake area is much smaller in comparison with the area of the flange portion. The smaller of the diameter of the spool, the smaller the brake force will become. Accordingly, in the lever drag mechanism mounted on the small diameter spool, in order to produce the larger brake force, it is necessary to increase the pressure force (thrust load). If the pressure force is increased, then the brake performance becomes worse. For example, the lever operation needs a greater power. It is difficult to finely adjust the brake force by the fine operation of the lever. Also, the variation in brake force due to the corrugation or the like of the contact surfaces between the frictional disc and the brake disc is remarkable so that the smoothness upon the drag operation is deteriorated. Furthermore, the durability of the frictional disc or the brake disc would be degraded. Thus, particularly in case of the small diameter spool, it is necessary to increase the pressure force if the large brake force is to be obtained. Accordingly, it is difficult to enhance the brake performance.

SUMMARY OF THE INVENTION

An object of the present invention is to enhance the brake performance while suppressing the pressure force operating in the double bearing reel having the drag mechanism.

In accordance with the present invention, a double bearing reel includes a reel body, a handle member, a spool shaft, a spool, a drag mechanism and a torque transmission mechanism. The handle member includes a handle shaft rotatably supported on the reel body. The spool shaft is disposed in parallel with the handle shaft. The spool has a fishing line winding drum portion for winding the fishing line and flange portions formed on both sides of the fishing line winding drum portion and is mounted on the spool shaft. The drag mechanism has a brake disc disposed coaxially with the spool in cooperation with the spool, a frictional disc disposed to face and to be engagable with the brake disc and non-rotatable in a fishing line feeding direction, and a moving mechanism for braking the spool by a relative movement between the brake disc and the frictional disc in a press contact direction. A brake diameter in relation with diameters of the brake disc and the frictional disc is 90% or more of a fishing line windable diameter of the spool. The torque transmission mechanism is a mechanism for transmitting a rotation of the handle shaft through the drag mechanism to the spool.

In this double bearing reel, when the handle is rotated in the fishing line winding direction, the frictional disc is rotated through the torque transmission mechanism. Then, the rotation is transmitted to the spool through the brake disc so that the spool is rotated in the winding direction to wind the fishing line around the spool. When the fish is hooked by a fishing device mounted at a tip end of the fishing line on the way of the winding operation and the drag mechanism is operated so that the spool is rotated in the fishing line feeding direction, the brake disc is rotated in the fishing line feeding direction in cooperation with the spool. In this case, since the frictional disc is not rotatable in the fishing line feeding direction, the brake force in response to the press contact force between the brake disc and the frictional disc is applied to the spool. At this time, the brake force depends upon the brake diameter of the spool, i.e., a maximum diameter of the portion where the brake disc and the frictional disc are brought into pressing contact with each other. Since this brake diameter is 90% or more of the fishing line windable diameter, i.e., the diameter of the flange portion and is greater than that of the conventional reel. Even in a spool having a small diameter, in order to increase the brake force, it is unnecessary to increase the pressure force to an excessive extent, and it is possible to enhance the brake performance.

Preferably, the torque transmission mechanism includes a pinion gear supported on the spool shaft and rotated in one-piece manner with the frictional disc, a main gear mounted non-rotatably on the handle shaft and engaged with the pinion gear and a reverse rotation preventing mechanism for preventing the handle shaft or a rotational part in cooperation with the handle shaft from rotating in the fishing line feeding direction. The frictional disc is prevented from rotating in the fishing line feeding direction by the reverse rotation preventing mechanism. In this case, upon the line winding, the rotation of the handle shaft is transmitted to the pinion gear through the main gear to rotate the frictional plate. On the other hand, when the drag mechanism is operated, the brake disc is rotated by the rotation in the fishing line feeding direction of the spool (reverse rotation) so that the frictional plate is urged to be rotated. However, since the rotation of the frictional disc in the fishing line feeding direction is prevented by the reverse rotation preventing mechanism, the brake force is applied to the spool through the brake disc. In this case, since the reverse rotation preventing mechanism provided in the torque transmission mechanism prevents the reverse rotation of the frictional disc, it is unnecessary to provide the reverse rotation preventing mechanism to the frictional disc.

Preferably, the drag mechanism further includes a receiving case for receiving the brake disc and the frictional disc. In this case, the two discs are disposed in the receiving case so that the sea water or the like hardly invades into the press contact portion and the brake force hardly changes.

Preferably, the brake disc is fixed to one end face of the flange portion of the spool. In this case, a diameter of the flange portion fixed to the brake disc is greater than that of the other flange portion so that the brake diameter may be increased.

Preferably, the spool is rotatably supported on the spool shaft and movable in an axial direction together with the spool shaft, and the moving mechanism moves the spool shaft in the axial direction relative to the reel body together with the spool. In this case, when the spool shaft is moved on one side in the axial direction by the moving mechanism, the brake disc fixed to the spool is brought into pressing contact with the frictional disc so that the spool is braked in response to the contact force.

Preferably, the brake disc is disposed outside of the flange portion of the spool and supported non-rotatably on the spool shaft. In this case, since the brake disc is not fixed to the spool, the diameter does not depend on the spool diameter. For this reason, it is possible to select the diameters of the two discs as desired.

Preferably, the reel further includes a clutch mechanism for engaging/disengaging the spool and the spool shaft, wherein the spool is rotatably supported to the spool shaft and supported movable in the axial direction together with the spool shaft, and the moving mechanism moves the spool shaft in the axial direction relative to the reel body together with the spool. In this case, it is sufficient to interrupt the connection between the spool and the spool shaft by the clutch mechanism without separating the brake disc and the frictional disc when the fishing line is paid out under the free rotational condition of the spool. For this reason, it is possible to always keep the press contact condition of the drag mechanism constant and to suppress the change in brake force.

Preferably, the moving mechanism includes a cap member mounted at one end of the spool shaft to be not movable in the axial direction but rotatable, a drag lever mounted on the reel body to be pivotable about the spool shaft, a cam member mounted on the reel body to be non-rotatable and disposed between the drag lever and the cap member for moving the cap member on one side in the axial direction by the swing motion of the drag lever, and a biasing member for biasing the spool shaft on the other side in the axial direction. In this case, when the drag lever is swung in one direction so that the cap member is moved on one side in the axial direction by the cam member, the spool shaft is moved in response thereto so that the press contact force between the brake disc and the frictional disc is changed. Also, when the drag lever is swung in the other direction, the spool shaft is moved on the other side in the axial direction by the biasing member so that the press contact force between the brake disc and the frictional disc is changed.

DETAILED DESCRIPTION OF THE PREFERRED EMBODIMENT

Figure 1:
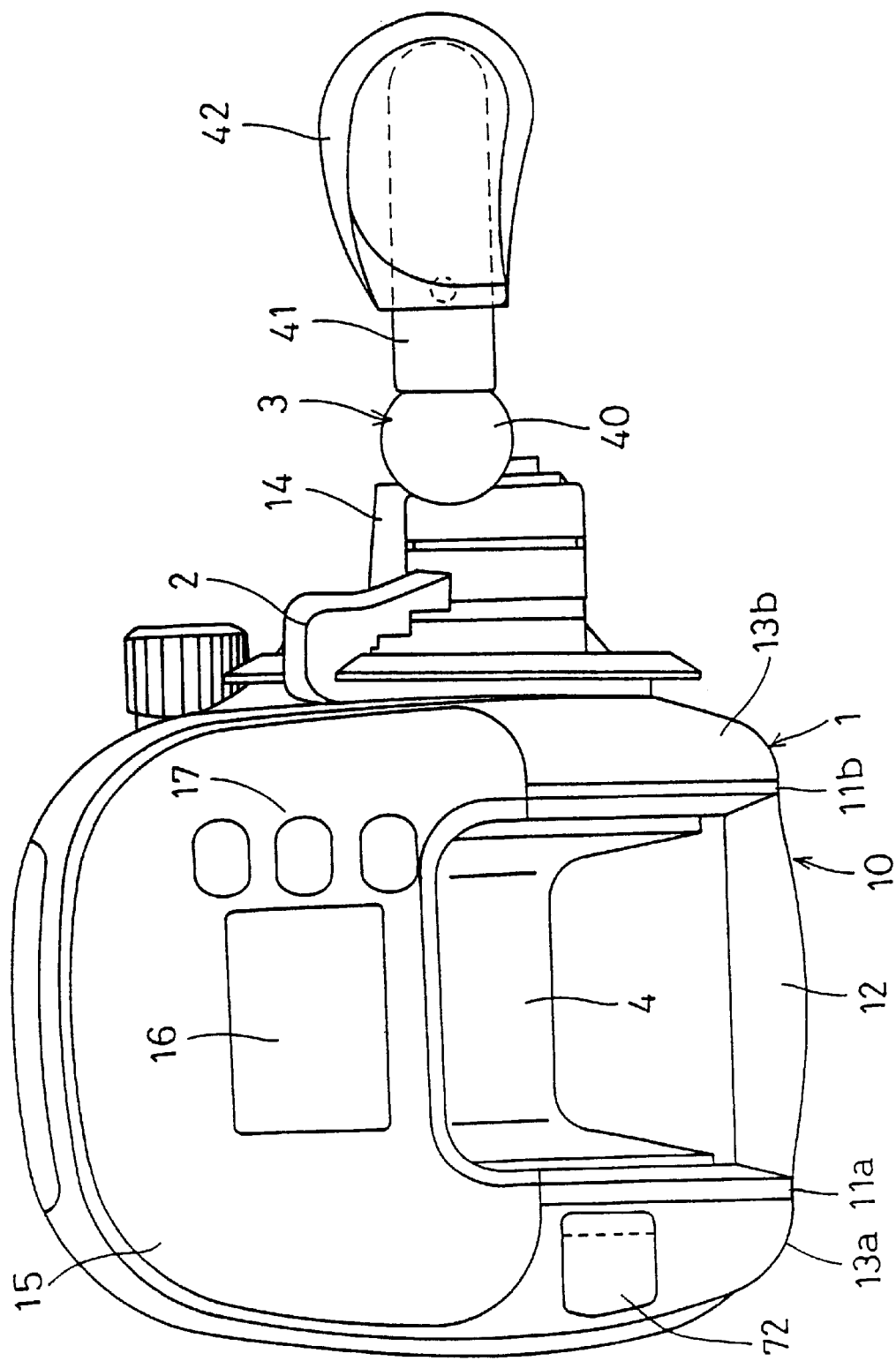
FIG. 1 is an elevational view showing a double bearing reel in accordance with one embodiment of the present invention.
Figure 2:
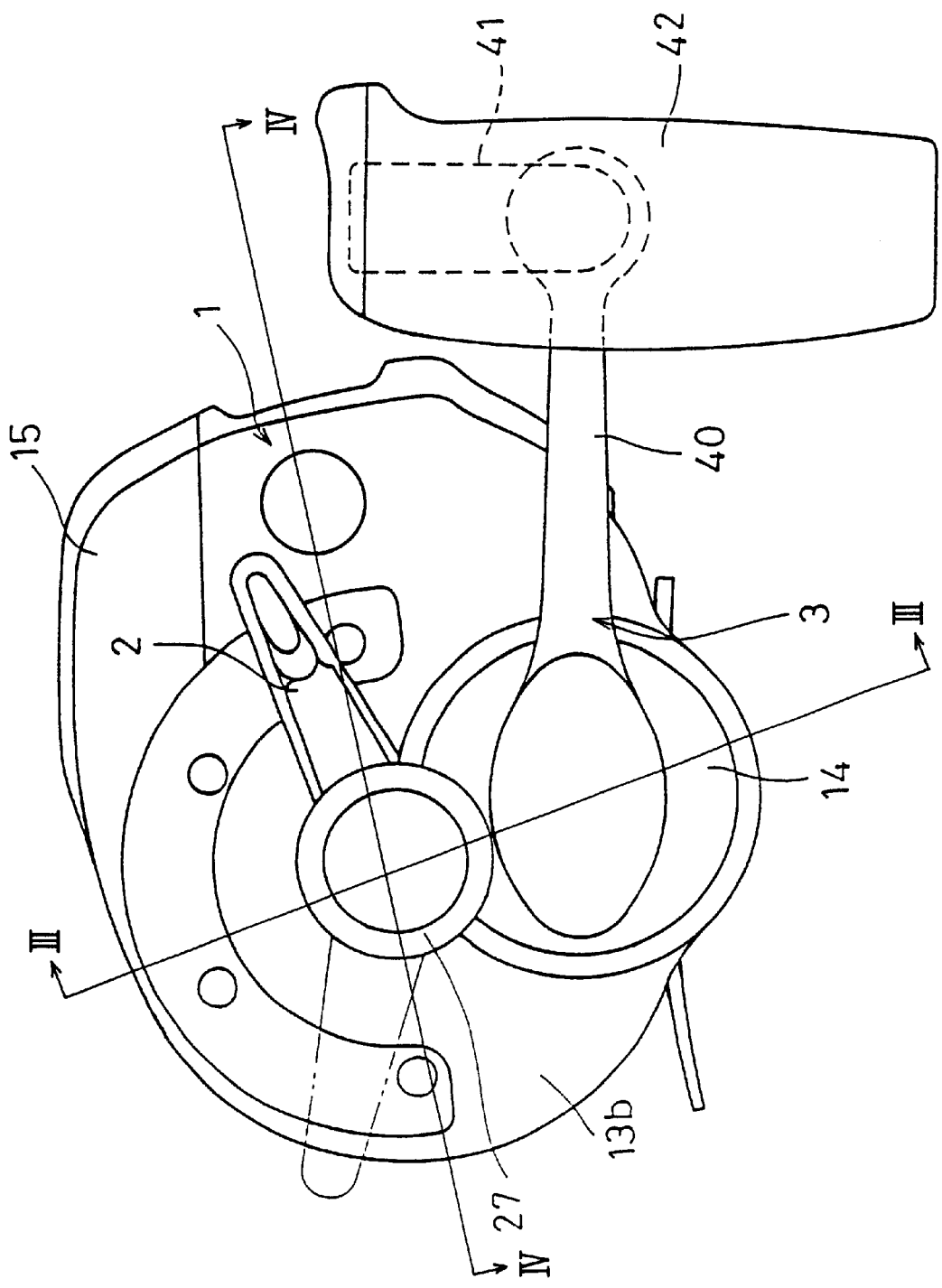
FIG. 2 is a side elevational view of the double bearing reel depicted in FIG. 1.

In FIGS. 1 and 2, a double bearing reel in accordance with one embodiment of the present invention includes a lever drag type mechanism. The double bearing reel is provided with a reel body 1 within which a spool 4 is disposed, a drag lever 2 is pivotally disposed on a side of the reel body 1, and a handle 3 is rotatably supported to the reel body 1 below the drag lever 2.

The reel body 1 has a frame 10 composed of a pair of right and left side plates 11a and 11b and a plurality of connecting portions 12 for connecting the side plates 11a and 11b, and side covers 13a and 13b for covering the frame 10 on both sides. A counter case 15 is fixed on an upper portion of the reel body 1. A liquid crystal display section 16 and an operational key section 17 are provided in the counter case 15. The liquid crystal display section 16 indicates a depth of water of a fishing device measured from a tip end of a fishing line fed from the spool 4. The operational key section 17 is used when various operations such as a selection operation of a fishing depth zone or the display mode are performed.

Figure 3:
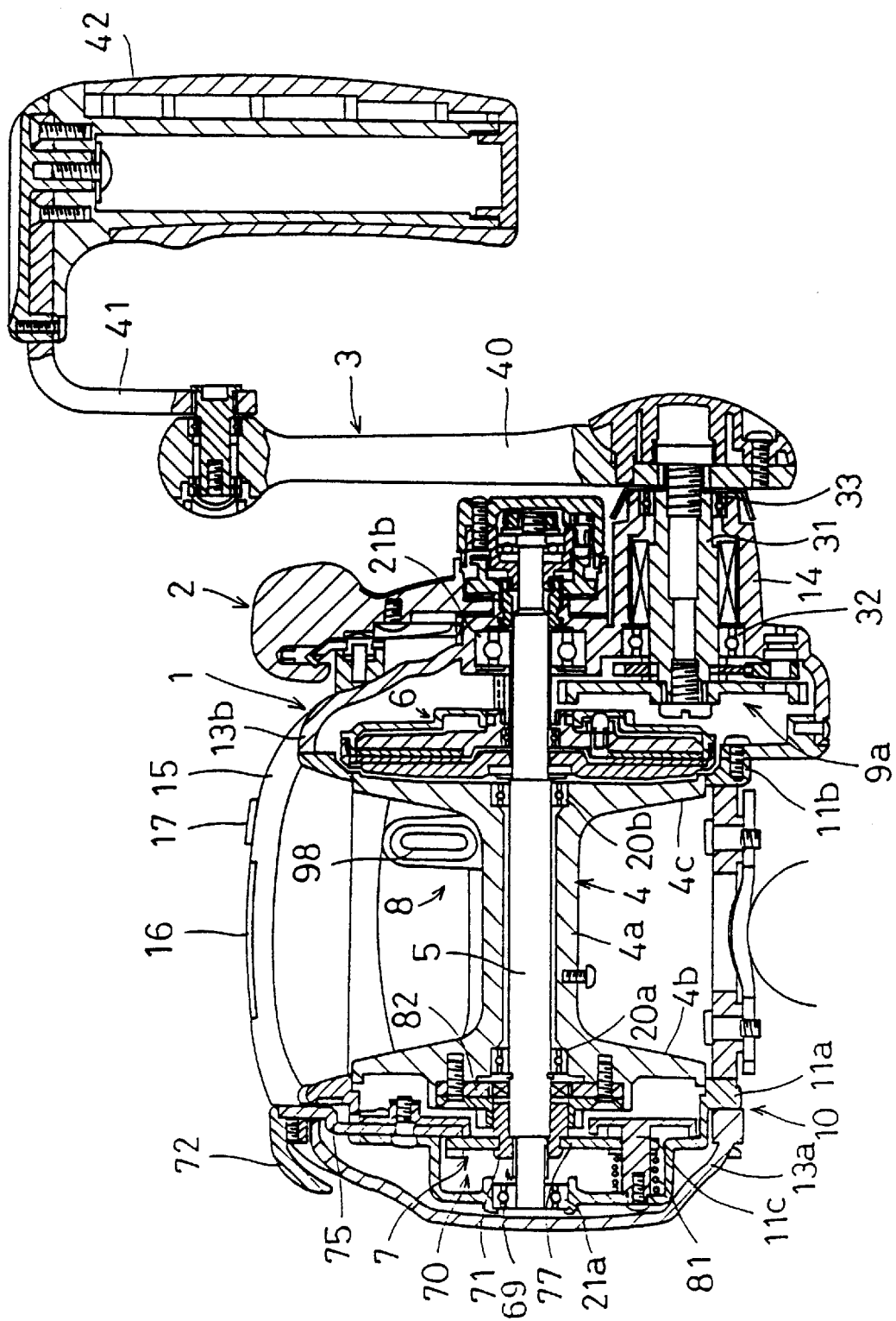
FIG. 3 is a cross sectional view taken along the line III—III in FIG. 2.
Figure 4:
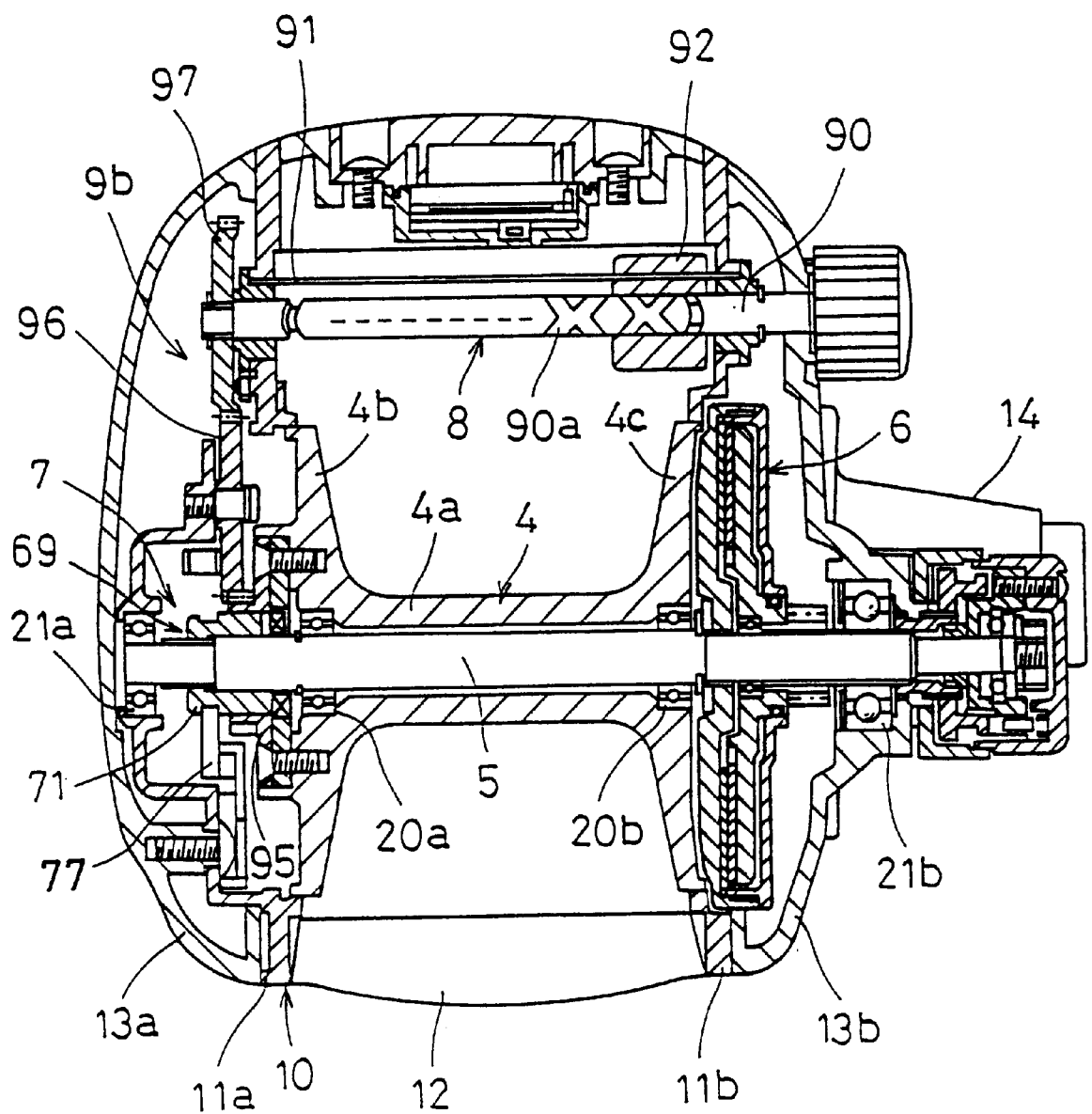
FIG. 4 is a cross-sectional view taken along the line IV—IV in FIG. 2.

As shown in FIGS. 3 and 4, the spool 4 is provided in the interior of the reel body 1. The spool 4 has a sleeve-like fishing line winding drum portion 4a and large diameter flange portions 4b and 4c formed on both sides of the fishing line winding drum portion 4a. The flange portions 4b and 4c have the same diameter and such a shape that their curved lines on the line winding side are symmetrical about the center. The spool 4 is rotatably supported on the spool shaft 5 by bearings 20a and 20b. The spool shaft 5 is rotatably supported on the reel body 1 by bearings 21a and 21b.

A drag mechanism 6 for braking the spool 4 is provided on the side of the spool 4 adjacent to the handle 3. A clutch device 7 for engaging/disengaging the spool 4 and the spool shaft 5 is provided on a side of the spool 4 opposite the drag mechanism 6 of the spool 4. A level winding mechanism 8 for uniformly winding the fishing line around the spool 4 is provided in front of the spool 4. Also, a first torque transmission mechanism 9a for transmitting the rotation of the handle 3 to the spool 4 is provided in between the side plate 11b and the side cover 13b. A second torque transmission mechanism 9b for operating the level winding mechanism 8 in cooperation with the rotation of the spool 4 is provided in between the side plate 11a and the side cover 13a.

Figure 5:
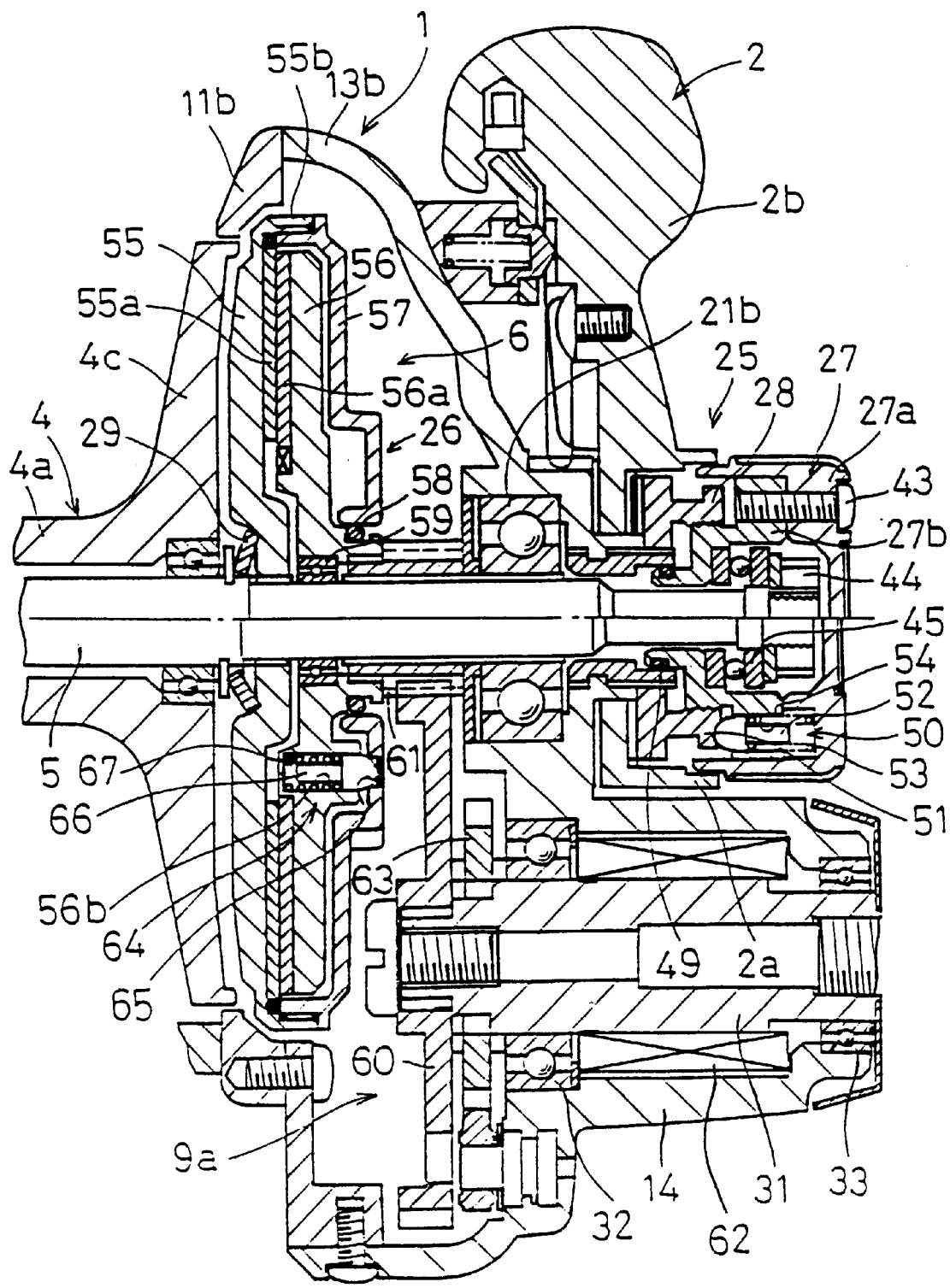
FIG. 5 is a cross-sectional view similar to FIG. 3, showing portions of the double bearing reel depicted in FIG. 3 on an enlarged scale.

A projecting sleeve 14 extending outwardly is formed under the drag lever 2 of the side cover 13b. A handle shaft 31 is disposed in parallel with the spool shaft 5 in the interior of the projecting sleeve 14. As shown in FIG. 5, the handle shaft 31 is rotatably supported within the projecting sleeve 14 by two bearings 32 and 33 disposed on respective ends of the projecting sleeve 14. A roller type first one-way clutch 62 is disposed between the bearings 32 and 33. The first one-way clutch 62 allows only the rotation of the handle shaft 31 in a line winding direction. A claw type second one-way clutch 63 is also disposed on the handle shaft 31. Also, the second one-way clutch 63 allows only the rotation of the handle shaft 31 in the line winding direction. The second one-way clutch 63 is disposed between a main gear 60 to be described later and the bearing 32. The reason why the two one-way clutches 62 and 63 are provided is that idle movement is reduced by the first one-way clutch 62 upon the reverse rotation, and the handle shaft 31 is not rotated reversely even if a strong force exceeding a limit of the first one-way clutch 62 is applied to the handle shaft 31 through the main gear 60 when the drag mechanism 6 is operated by the second one-way clutch 63.

As shown in FIG. 3, the handle 3 is fixed to a tip end of the handle shaft 31. The handle 3 is provided with an arm member 40 fixed to the tip end of the handle shaft 31, a rotary member 41 rotatably supported on a tip end of the arm member 40, and a grip member 42 fixed to a tip end of the rotary member 41.

As shown in FIG. 5, the drag mechanism 6 is provided with a spool shaft moving mechanism 25 for reciprocatingly moving the spool shaft 5 in an axial direction and a brake portion 26. Incidentally, the upper half of FIG. 5 shows the spool shaft 5 in one axial position such that there is a maximum drag application and the lower half of FIG. 5 shows the spool shaft 5 in another axial position where the drag force is decreased, compared to the position of the spool shaft 5 shown in the upper half of FIG. 5.

The spool shaft moving mechanism 25 is provided with the drag lever 2 rotatably supported on the side cover 13b of the reel body 1, a cap member 27 mounted at the axial end of the spool shaft 5, a cam member 28 disposed between the cap member 27 and the drag lever 2, and a dish spring 29 for biasing the spool shaft 5 toward the left side of FIG. 5.

The drag lever 2 is so structured that a boss portion 2a formed in a central portion thereof is rotatably supported on the side cover 13b and a lever portion 2b extending radially therefrom is moveable between a plurality of positions in the circumferential direction relative to the side cover 13b. The cap member 27 is composed of a dial portion 27a disposed so as to cover the axial end of the spool shaft 5 and a shaft supporting portion 27b fastened by the dial portion 27a and a screw 43. The shaft supporting portion 27b is disposed to clamp a thrust bearing 45 with a nut 44 screwed at the axial end of the spool shaft 5 and is supported so as to rotate but may not move in the axial direction relative to the spool shaft 5. A tip end of the shaft supporting portion 27b is fitted in a through-portion of the side cover 13b through which the spool shaft 5 extends. An O-ring 49 is interposed between the side cover 13b and this fitted portion. As a result, a thrust bearing 45 is disposed in a water-tight space sealed by the O-ring 49 and is thus protected against the intrusion of sea water or the like.

The cam member 28 is supported on the side cover 13b on gear teeth such that the cam member 28 is movable in the axial direction but cannot rotate relative to the side cover 13b. The cam member 28 has a slanting cam surface formed on the drag lever 2. The cam member 28 is moved in the axial direction toward the left side of FIG. 5 by the rotation of the drag lever 2. For example, as the drag lever 2 is moved in a counterclockwise direction, relative to the depiction in FIG. 2, the drag force is reduced. Specifically, as shown in FIG. 2 in solid lines, the drag lever 2 is set in a maximum drag force position. The position of the drag lever 2 in dashed lines in FIG. 2 corresponds to a minimum drag force position.

The cam member 28 is coupled with the shaft supporting portion 27b of the cap member 27 by screws. By rotating the cap member 27, an initial position in the axial direction of the spool shaft 5 may be set. Thus, the drag force in the swing start position of the drag lever 2 may be adjusted. In this embodiment, the shaft supporting portion 27b and the cam member 28 are coupled with each other by counter crew threads. In FIG. 2, as the cap member 27 is rotated counterclockwise so that the engagement between the shaft supporting portion 27b and the cam member 28 is developed, the spool shaft 5 is moved to the left of FIG. 5 to reduce the initial drag force. The reason for this is that the direction of the operation of the drag lever 2 is identified with the direction of the operation of the cap member 27 so that the user may adjust the drag easily and conveniently.

A first sound generating mechanism 50 is disposed between the cam member 28 and the cap member 27. The first sound generating mechanism 50 has a plurality of recesses 51 formed at regular intervals in the circumferential direction so as to form a part of a spherical surface at the end face of the cam member 28, a sound generating pin 52 is disposed in the cap member 27 for contact with the recesses 51 and a coil spring 53 for biasing the sound generating pin 52 on the side of the recesses 51. The sound generating pin 52 is a mushroom-shaped shaft having a spherical shape at its tip end and is mounted for movement in the axial direction in a mounting hole 54 formed in communication with a space between the dial portion 27a of the cap member 27 and the shaft supporting portion 27b. The coil spring 53 is disposed in a compressed condition on the outer circumferential side of the shaft portion of the sound generating pin 52.

A brake portion 26 is disposed to the right side and outside of the spool 4, as shown in FIG. 5. The brake portion 26 includes: a brake disc 55 which is mounted on the spool shaft 5 via gear teeth such that the brake disc 55 may not rotate with respect to the spool shaft 5 but may move in the axial direction; a frictional disc 56 disposed to face the brake disc 55; and a thin cover disc 57 for covering the frictional disc 56.

The spool 4 has a fishing line windable diameter that is defined by the amount of that may be reasonably and safely wound about the spool 4, namely, the capacity of the spool 4. The brake disc 55 has an outer diameter greater than a diameter of the flange portion 4b which retains fishing line that may be wound on the spool 4. The brake disc 55 has a sleeve portion 55b at its outer circumferential portion. The cover disc 57 is coupled with the sleeve portion 55b to be non-rotatable with respect thereto. Accordingly, the outer diameter of the drag mechanism 6 is greater than the fishing line windable diameter. The frictional disc 56 has a smaller diameter than that of the brake disc 55 and is rotatably supported on the spool shaft 5 by a bearing 59. The frictional disc 56 is engaged at its inner circumferential surface with a pinion gear 61 that is described in greater detail below. Also, axial movement of frictional disc 56 on the right side of FIG. 5, is limited by the reel body 1 through the pinion gear 61.

The brake disc 55 and the frictional disc 56 include annular-shaped sliding discs 55a and 56a, each having substantially the same diameter, and mounted on the brake disc 55 and the frictional disc 56, respectively, for engagement with one another. The sliding disc 55a is made of, for example, heat resistive synthetic resin such as fiber reinforced resin obtained by impregnating a carbon fiber woven cloth with heat resistive resin such as phenol resin. The sliding disc 56a is made of, for example, a heat resistive and anti-corrosive metal such as stainless steel. Incidentally, a brake diameter of the brake portion 26 which is defined at a maximum diameter of the portion where the brake disc 55 and the frictional disc 56 are brought into contact with one another, i.e., a diameter which is smaller than the outer diameters of the sliding disc 55a and the sliding disc 56a, is 90% or more of the fishing line windable diameter defined by the largest amount of fishing line which may be wound about the spool 4.

For this reason, it is possible to obtain a greater brake force in comparison with a conventional reel in which a spool has the capacity for the same diameter amount of fishing line wound about the spool.

In the present invention, the fishing line windable diameter of the spool 4 is defined at a maximum outer diameter at which the fishing line may be wound around the spool 4 and may be as large as the outer diameter of the smaller one out of the flange portions 4b and 4c. In this embodiment, since the flange portions 4b and 4c have about the same diameter, it is the outer diameter of the flange portions 4b and 4c. However, it should be under stood that the flange portions 4b and 4c may be formed with differing outer diameters.

Also, since the brake diameter is large compared to prior art configurations, a correspondingly larger brake force may be obtained, and therefore it is unnecessary to increase the pressure force necessary for contact between the discs 55a and 56a, as compared to the prior art. Thus, the brake performance is enhanced. For example, the operation of the lever is smooth with a light force and it is easy to finely adjust the drag force. Also, the variation in brake force due to the corrugation or the like of the contact surfaces of the frictional disc 56 and the brake disc 55 may be suppressed, and the fishing line feed upon the drag operation may be smoothed. Also, the durability of the frictional disc 56 and the brake disc 55 is enhanced and the rotation of the handle 3 becomes light.

The cover disc 57 is coupled with the brake disc 55 along its outer circumference to be non-rotatable and disposed to cover the frictional disc 56 between the brake disc 55 and the cover disc 57. The space between the frictional disc 56 and the cover disc 57 is sealed by an O-ring 58 in the central portion so that liquid such as sea water or foreign matters are unlikely to enter the space where the frictional disc 56 is disposed.

Figure 6:
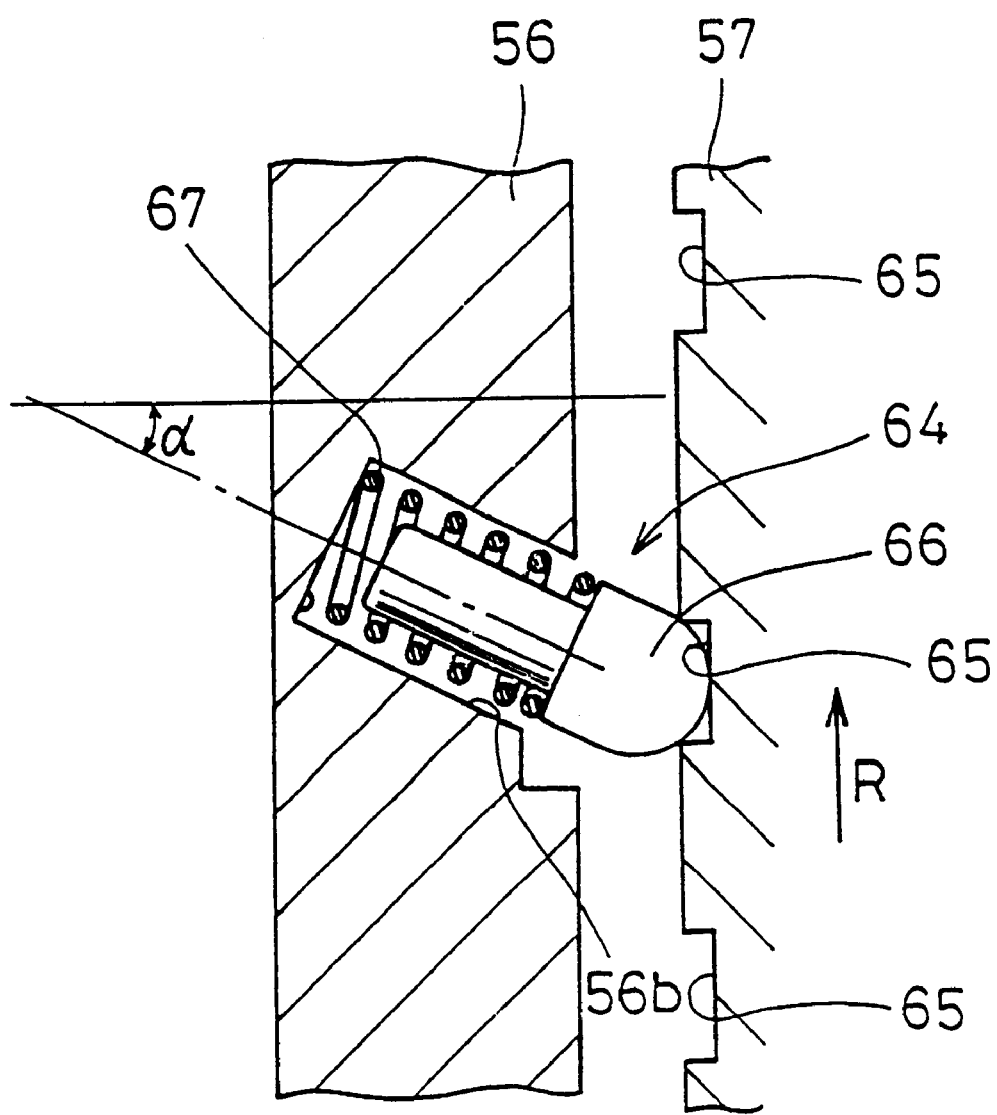
FIG. 6 is a cross sectional view of a second sound generating mechanism employed in the double bearing reel.

A second sound generating mechanism 64 for generating a sound upon the drag operation (upon the relative rotation between the brake disc 55 and the frictional disc 56) is mounted in between the cover disc 57 and the frictional disc 56. The second sound generating mechanism 64 includes a number of rectangular recesses 65 formed at an interval in the circumferential direction at the end face of the cover disc 57, a sound generating pin 66 disposed to come into contact with the recesses 65 and a coil spring 67 for biasing the sound generating pin 66 on the side of the recesses 65. The sound generating pin 66 is a mushroom-shaped shaft having a spherical shape at its tip end and is movably mounted in the axial direction in a mounting hole 56b formed on the central side from the mounted portion of the sliding disc 56a of the frictional disc 56. As shown in FIG. 6, the mounting hole 56b is opened on the side of the cover disc 57 and is formed to be slanted at an angle on the upstream side in the rotational direction R relative to the axial direction of the frictional disc 56. It is preferable that this angle be in the range of 10 to 40°. As a result, the sound generating pin 66 is slanted by the angle and mounted on the frictional disc 56. The coil spring 67 is disposed in a compressed condition on the outer circumferential side of the shaft portion of the sound generating pin 66. In this case, since the sound generating pin 66 is brought into collision with the relatively thin cover disc 57 rather than the brake disc 55, a clear sound may be generated. Also, since the mounting hole 56b is formed obliquely, it is possible to thin a thickness of the brake disc 55 while keeping the stroke of the sound generating pin 66.

As shown in FIG. 5, a first torque transmission mechanism 9a has a main gear 60 fixed to the other end of the handle shaft 31 and a pinion gear 61 rotatably mounted about the outer circumferential side of the spool shaft 5 and engaged with the main gear 60. The pinion gear 61 is retained unrotatably on the friction disc 56 of the brake portion 26. As a result, the torque from the handle 3 is transmitted to the brake disc 55 through the main gear 60, the pinion gear 61 and the frictional disc 56 and is transmitted from the brake disc 55 to the spool shaft 5.

Figure 7:
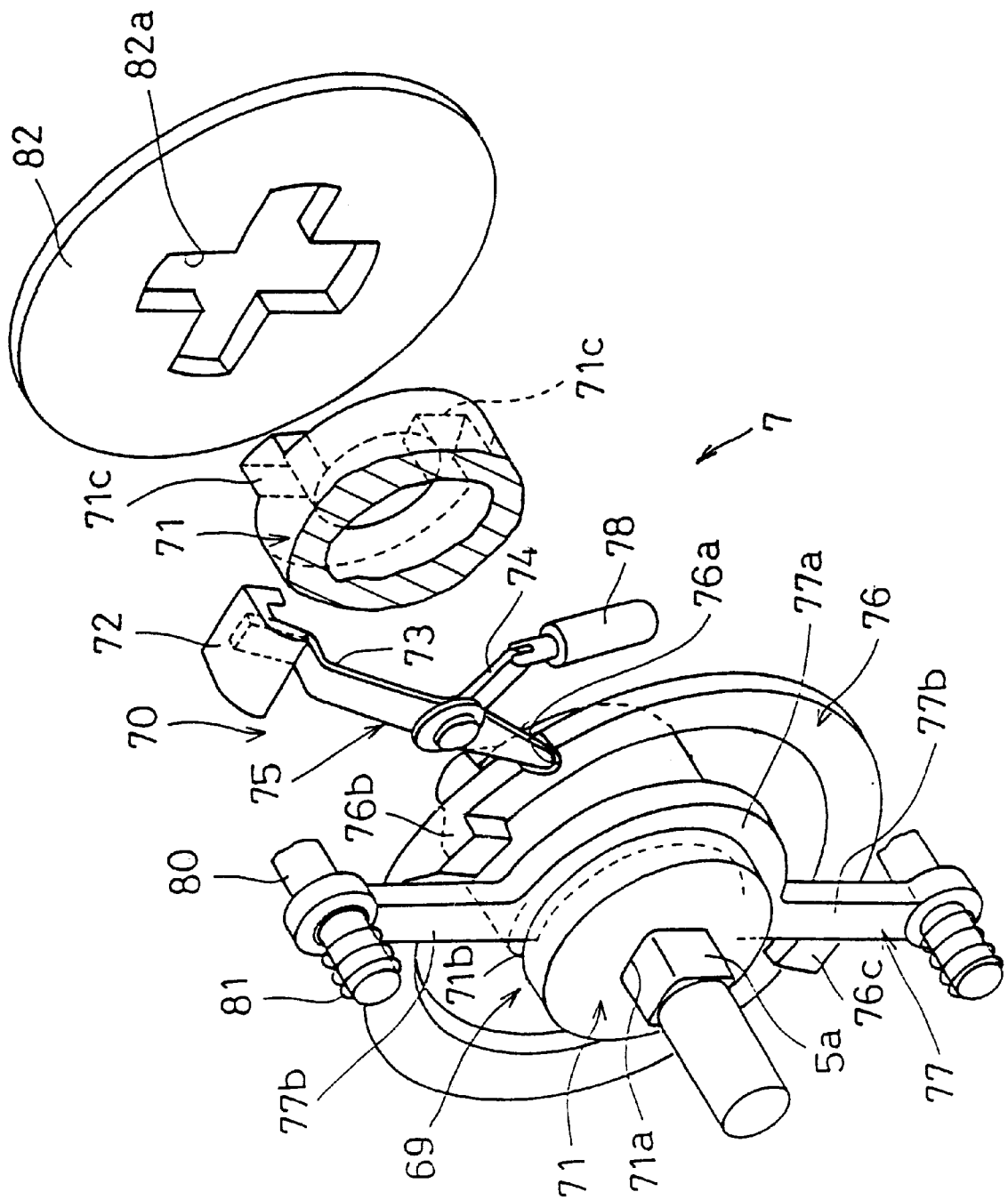
FIG. 7 is a perspective view of a clutch device employed in the double bearing reel.

As shown in FIG. 7, the clutch device 7 has a clutch mechanism 69 for engaging/disengaging the spool shaft 5 and the spool 4, and a clutch operating section 70 for engaging/disengaging operation of the clutch mechanism 69.

The clutch mechanism 69 has a clutch member 71 and a clutch plate 82. The clutch member 71 is a substantially sleeve-like member and supported on the spool shaft 5 movably in the axial direction but non-rotatably with respect thereto. A rectangular engagement hole 71a is formed in the inner circumferential surface of the clutch member 71 and is engaged with a square, chamfered portion 5a formed around the outer circumferential surface of the spool shaft 5 to be movable in the axial direction but non-rotatable with respect to the clutch member 71. An annular retainer groove 71b is formed around the full circumference of the outer circumferential surface of the clutch member 71 and retains a contact portion 77a of a clutch yoke 77, as is described below.

The clutch plate 82 is a disc-like member mounted on the end face of the flange portion 4b of the spool 4. A cruciform clutch retainer hole 82a is formed in the central portion of the clutch plate 82. Also, two clutch projections 71c which are engaged with the clutch retainer hole 82a are formed in diametrically opposite positions on the right end face of the clutch member 71.

The clutch operating portion 70 includes: a clutch lever 75 pivotally supported on a fixed plate 11c (see FIG. 3) fixed to the left side plate 11a; a ring-shaped clutch cam 76 rotatably supported within the side plate 11a; and a clutch yoke 77 which may be moved in axial directions by the clutch cam 76.

The clutch operating lever 75 has a grip portion 72 disposed on the outer circumferential side of the reel body 1 and a lever portion 73 extending inwardly from the grip portion 72. This lever portion 73 is rotatably supported on the side plate 11a. The tip end of the lever portion 73 is retained at an engagement recess 76a formed in an outer circumferential surface of the clutch cam 76. This clutch operating lever 75 is pivoted so that the clutch cam 76 is rotated. The lever portion 73 has a toggle lever 74 extending substantially in the circumferential direction in the rotation portion. A toggle portion 78 is rotatably coupled with a tip end of the toggle lever 74. The toggle portion 78 has a toggle spring in its interior such that the clutch operating lever 75 is provided with means for its position. Specifically, the toggle portion 78 maintains the position of the clutch engagement position shown in FIG. 7 and in a clutch release position where it is rotated slightly in a counter-clockwise direction from the position depicted in FIG. 7.

The clutch cam 76 has the above-described engagement recess 76a on its outer circumferential surface. Also, the clutch cam 76 has two slant cam portions 76b and 76c on the side of the clutch yoke 77.

The slant cam portions 76b and 76c are formed to be projected to the left in the axial direction of FIG. 7 and come into contact with the clutch yoke 77, respectively, to serve to move the clutch yoke 77 to the left in the axial direction of the spool shaft 5. The clutch yoke 77 has a semicircular arcuate contact portion 77a disposed on the outer circumferential side of the spool shaft 5 and support portions 77b extending radially outwardly from both ends of the contact portion 77a. The contact portion 77a is retained at the retainer groove 71b of the clutch member 71. The support portion 77b is movably supported in the axial direction to a pair of guide shafts 80. Each of the guide shaft 80 projects from the fixed plate 11c, disposed symmetrical with respect to the spool shaft 5 and in parallel with the spool shaft 5. A return spring 81 is wound around an outer circumference of each guide shaft 80 under compressed condition, and the clutch yoke 77 is biased to the right of FIG. 6 (in the direction of the clutch engagement) by the return spring 81.

In this clutch device 7, grip portion 72 of the clutch operating lever 75 is swung clockwise (relative to FIG. 7) to rotate the clutch cam 76 counterclockwise. As a result, the clutch yoke 77 rides over the slant cam portions 76b and 76c of the clutch cam 76. The clutch cam 76 depresses the clutch yoke 77. As a result, the clutch yoke 77 is moved outwardly in the axial direction. The clutch member 71 is moved outwardly in the axial direction so that the engagement between the clutch retainer hole 82a and the clutch projections 71c is released and the clutch mechanism 69 is kept in the released condition. Inversely, the clutch operating lever 75 is swung counterclockwise in FIG. 7 so that the clutch cam 76 is rotated in the clockwise direction whereby the clutch yoke 77 is released away from the slant cam portions 76b and 76c of the clutch cam 76. As a result, the clutch yoke 77 is moved inwardly in the axial direction by the pressure force of the return springs 81, the clutch member 71 is is moved inwardly in the axial direction and the clutch retainer hole 82a and the clutch projections 71c is engaged to thereby bring the clutch mechanism 69 into the engaged condition.

As shown in FIG. 4, the level winding mechanism 8 has a screw shaft 90 rotatably supported to the side plates 11a and 11b in front of the spool 4, a guide member 91 disposed along the screw shaft 90 around the screw shaft 90, and a fishing line guide 92 guided by the guide member 91. The screw shaft 90 is rotated in cooperation with the spool 4 by the second torque transmission mechanism 9b disposed between the side plate 11a and the side cover 13a. A crossed screw groove 90a is formed at a predetermined length on the outer circumferential surface of the screw shaft 90. An engagement member (not shown) engaged with the screw groove 90a of the screw shaft 90 is mounted on the fishing line guide 92. The engagement member is engaged with the screw groove 90a so that the fishing line guide 92 is reciprocatingly moved along the spool shaft 5 in response to the rotation of the screw shaft 90. As shown in FIG. 3, an oblong hard ring 98 for guiding the fishing line is mounted on the fishing line guide 92.

The second torque transmission mechanism 9b has a first gear 95 mounted on the outside of the clutch plate 82 in the end face of the flange portion 4b of the spool 4, a second gear 96 mounted on the side plate 11a so as to be engaged with the first gear 95, and a third gear 97 mounted at one end of the screw shaft 90 and engaged with the second gear 96. Here, the rotation of the spool 4 is transmitted to the screw shaft 90 through the three gears 95 to 97, and the fishing line guide 92 moves in a reciprocating manner in cooperation with the spool 4.

In the thus constructed double bearing reel, when the fishing device is lowered, the clutch operating lever 75 is operated so that the clutch device 7 is brought into the released condition. As a result, the spool 4 is kept in a free rotational condition and the fishing line is fed by the gravitational force of the fishing device. In this case, only by operating the clutch operating lever 75 in the released position, the clutch mechanism 69 is brought into the released condition, and the spool 4 may be simply brought into the free rotational condition.

When it is confirmed by the liquid crystal display portion 16 that the fishing device has reached a predetermined depth, the clutch operating lever 75 is operated to the engagement portion to bring the clutch mechanism 69 into the engaged condition. When the clutch mechanism 69 is kept in the engaged condition, the rotation in the fishing line feeding direction of the handle shaft 31 is prohibited by the one-way clutches 62 and 63. Accordingly, the reverse rotation of the spool shaft 5 is prevented through the drag mechanism 6 and the first torque transmission mechanism 9a to stop the feed of the fishing line. When a fish is hooked by the fishing device in this condition, the spool 4 is about to rotate in the fishing line feeding direction by the drag of the fish. At this time, the fishing line is fed by a predetermined drag force set by the operation of the drag lever 2. In this case, when the drag lever 2 is swung clockwise in FIG. 2, the spool shaft 5 is moved in the right direction of FIG. 5 by the can member 28, and the brake disc 55 and the frictional disc 56 are brought into strong contact with each other to increase the drag force. On the other hand, when the drag lever 2 is swung in the counterclockwise direction relative to FIG. 2, the spool shaft 5 is moved back to the left relative to FIG. 5 by the dish spring 29 so that the pressure force of the brake disc 55 against the frictional disc 56 becomes smaller, resulting in reduced contact pressure between two discs 55 and 56 to thereby decrease drag force. When the two discs 55 and 56 are rotated relative to each other upon the drag operation, the sound generating pin 66 of the second sound generating mechanism 64 disposed between the frictional disc 56 and the cover disc 57 repeats the collision against the cover disc 57 so that the sound is generated between the relatively thin cover disc 57 and the sound generating mechanism. As a result, the fact that the drag is operated is immediately notified to the user.

Figure 8:
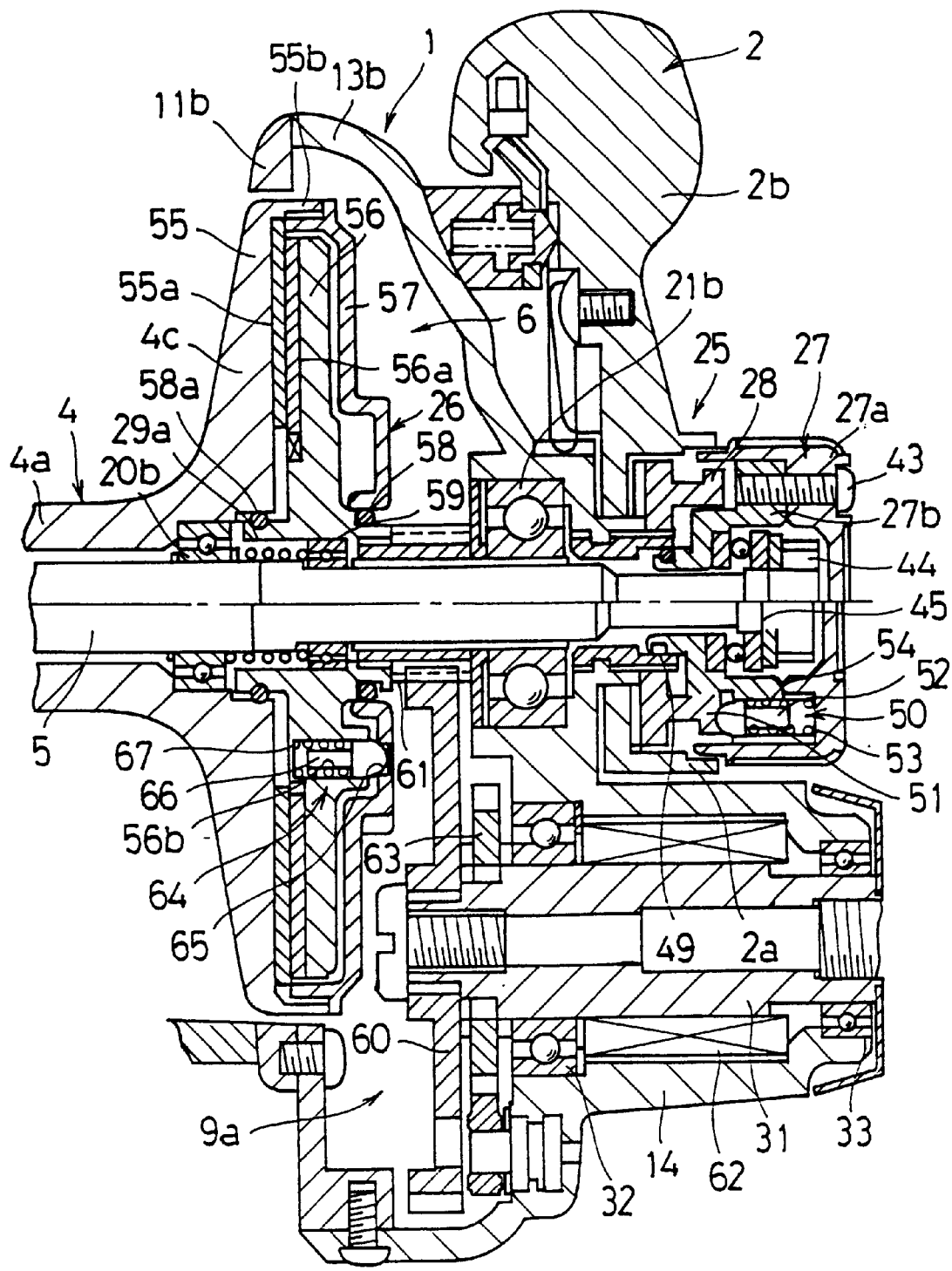
FIG. 8 is a view similar to FIG. 5, showing an alternate embodiment of the present invention.

OTHER EMBODIMENTS (a) In the foregoing embodiment, the brake portion 26 is disposed outside of the spool but as shown in FIG. 8, it is possible to make the brake disc 55 of the brake portion 26 into a one-piece structure with the flange portion 4c of the spool 4. The sliding disc 55a is fixed to the end face of the flange portion 4c and the cover plate 57 is fixed to the circumferential edge portion. Also, a coil spring 29a for biasing in the left direction of FIG. 8 the spool shaft 5 on the outer circumferential side of the spool shaft 5 between a bearing 20b for supporting the spool 4 and a bearing 59 for supporting the brake disc 56 is disposed in a compressed condition. The frictional disc 56 projects on the side of the brake disc 55 on the inner circumferential side, and an O-ring 58a is mounted at the projecting portion. The O-ring 58a prevents the sea water or the like from entering into the space from the inner circumferential side. Additionally, it is possible to omit the clutch device in this alternate embodiment. In the case where the spool 4 is kept in the free rotational condition, the drag lever 2 is operated to separate the brake disc 55 and the frictional disc 56 from each other.

In this alternate embodiment, the fishing line windable diameter of the spool 4 is the outer diameter of the flange portion 4b which is smaller since the outer diameters of the two flange portions 4b and 4c are different from each other. Also, the brake diameter is the diameter of the smaller one out of the sliding discs 55a and 56b. Also in this embodiment, the brake diameter is 90% or more of the fishing line windable diameter.

(b) In the foregoing alternate embodiment, the spool 4 is rotatably mounted on the spool shaft 5, the spool may be also alternatively mounted on the spool shaft to be non-rotatable with respect thereto. In this case, the rotation of the handle is transmitted to the spool shaft through the torque transmission mechanism to rotate the spool. Also, the drag mechanism is composed of the brake disc formed integrally with the flange portion of the spool and the frictional disc fixed to the reel body.

(c) In the foregoing embodiment, the spool shaft is moved in the axial direction to adjust the drag force but it is possible to adjust the drag force by moving only the spool in the axial direction.

(d) The sliding discs disposed on the brake disc 55 and the frictional disc 56 may be reversely arranged. Namely, the sliding disc made of metal may be disposed on the brake disc 55 and the sliding disc made of the fiber reinforced resin may be disposed on the frictional disc 56.

EFFECT OF THE INVENTION

As described above, according to the present invention, since the brake diameter of the drag mechanism is 90% or more of the fishing line windable diameter of the spool, i.e., the diameter of the flange portion, it is possible to enhance the brake performance even if the spool has a small diameter.

What is claimed is:

1. In a dual-bearing fishing reel whose body supports a spool shaft on a pair of bearings, the spool shaft rotatively carrying a fishing-line spool formed at either end with respective first and second flanges at least one of which defining the maximum diameter of fishing line the spool can hold, the reel on the Spool first-flange side having a one-way clutch controlled torque transmission mechanism gear-linking a line-winding handle shaft carried in the reel body to a pinion gear rotatively carried on the spool shaft, a drag mechanism comprising:

a brake disk mounted coaxially on the spool shaft, adjacent to but spaced apart from the spool first flange, said brake disk having a circumferential rim greater in diameter than both the first and second flanges and extending in an outer lip axially away from the first flange;

a friction disk disposed coaxially with the spool shaft and encompassed by said outer lip, said friction disk having a friction surface facing said brake disk for pressing contact therewith;

a cover disk coaxial with the spool shaft opposite said brake disk and coupled rim-wise to said outer lip, said brake disk and said cover disk therein encasing said friction disk;

a shifting mechanism associated with said brake disk and the spool shaft for adjusting drag by pressing said brake disk against and releasing it from said friction disk; wherein rotation of the line-winding handle shaft is transmitted through the drag mechanism to the spool shaft.

2. The drag mechanism as set forth in claim 1, wherein said brake disk and said friction disk in pressing contact define a braking dimension whose diameter is at least 90% of the maximum diameter of fishing line the spool can hold.

3. The drag mechanism as set forth in claim 1, wherein said friction disk coaxial with and rotatable relative to the spool shaft and has a radial inward portion engaged with the pinion gear, wherein the one-way clutch prevents said friction disk from turning when the spool rotates to cast fishing line.

4. The drag mechanism as set forth in claim 1, wherein:
said brake disk is axially shiftable; and
said shifting mechanism includes a cone spring between said brake disk and a retainer encompassing the spool shaft adjacent the spool first flange, said cone spring urging the spool shaft away from said brake disk; said shaft shifting mechanism therein increasing drag by shifting said brake disk against the urging of said cone spring away from the spool first flange.

* * * * *